(12) United States Patent
Stojkovic et al.

(10) Patent No.: US 12,487,659 B2
(45) Date of Patent: Dec. 2, 2025

(54) MANAGING POWER FOR SERVERLESS COMPUTING

(71) Applicant: INTERNATIONAL BUSINESS MACHINES CORPORATION, Armonk, NY (US)

(72) Inventors: Jovan Stojkovic, Champaign, IL (US); Hubertus Franke, Cortlandt Manor, NY (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 18/206,283

(22) Filed: Jun. 6, 2023

(65) Prior Publication Data

US 2024/0411357 A1 Dec. 12, 2024

(51) Int. Cl.
*G06F 1/00* (2006.01)
*G06F 1/329* (2019.01)

(52) U.S. Cl.
CPC .................................. *G06F 1/329* (2013.01)

(58) Field of Classification Search
CPC ....................................................... G06F 1/329
See application file for complete search history.

(56) References Cited

U.S. PATENT DOCUMENTS

| | | | |
|---|---|---|---|
| 7,007,276 B1 * | 2/2006 | Kubala ................ | G06F 9/5077 718/104 |
| 8,270,552 B1 * | 9/2012 | Oner ..................... | H04L 7/02 375/372 |
| 8,745,216 B2 | 6/2014 | Pasala et al. | |
| 9,606,842 B2 | 3/2017 | Kim | |
| 10,250,684 B2 | 4/2019 | Dimnaku et al. | |
| 10,429,921 B2 | 10/2019 | Potlapally et al. | |
| 10,747,289 B2 | 8/2020 | Ramamurthy et al. | |

(Continued)

OTHER PUBLICATIONS

Anonymous, "Method to call cached functions effectively in serverless computing paradigm to reduce FaaS latency", https://ip.com/IPCOM/000254459, Jun. 29, 2018; 4 Pages.

(Continued)

*Primary Examiner* — Jaweed A Abbaszadeh
*Assistant Examiner* — Ayman Fatima
(74) *Attorney, Agent, or Firm* — Monchai Chuaychoo; Andrew D. Wright; Calderon Safran & Wright P.C.

(57) ABSTRACT

Embodiments dynamically measure latency for a plurality of functions with a plurality of corresponding frequency levels within a serverless computing cluster; measure a transition latency from an idle state to an active state for the plurality of functions; determine whether a target response time to perform a service level objective (SLO) within the serverless computing cluster is going to be missed; dynamically reallocate at least one core and changing a frequency level across the plurality of functions by scaling down in response to a determination that the target response time to perform the SLO within the serverless computing cluster is going to be met; and dynamically reallocate the at least one core and changing the frequency level across the plurality of functions by scaling up in response to a determination that the target response time to perform the SLO within the serverless computing cluster is going to be missed.

20 Claims, 12 Drawing Sheets

(56) References Cited

U.S. PATENT DOCUMENTS

| | | | | |
|---|---|---|---|---|
| 11,018,965 | B1* | 5/2021 | Ibryam | H04L 43/08 |
| 11,030,016 | B2 | 6/2021 | Banerjee et al. | |
| 11,126,242 | B2 | 9/2021 | Shaikh et al. | |
| 11,451,455 | B2 | 9/2022 | Ganguli et al. | |
| 2004/0168170 | A1* | 8/2004 | Miller | G06F 9/5072 718/104 |
| 2017/0102752 | A1* | 4/2017 | Varma | G06F 1/3296 |
| 2017/0201580 | A1 | 7/2017 | Dimnaku et al. | |
| 2017/0212575 | A1* | 7/2017 | Wang | G06F 1/206 |
| 2018/0267833 | A1* | 9/2018 | Chen | G06F 9/45558 |
| 2019/0372866 | A1 | 12/2019 | Ganguli et al. | |
| 2020/0042068 | A1* | 2/2020 | Rong | G06F 1/3203 |
| 2020/0125389 | A1* | 4/2020 | Palermo | H04W 28/084 |
| 2020/0145300 | A1* | 5/2020 | Park | H04L 41/5022 |
| 2020/0301860 | A1* | 9/2020 | Hsu | G06F 1/3293 |
| 2022/0116455 | A1 | 4/2022 | Raghunath et al. | |
| 2022/0239598 | A1* | 7/2022 | Kumar | H04L 67/133 |
| 2022/0377615 | A1* | 11/2022 | Radunovic | H04W 72/21 |
| 2022/0404888 | A1* | 12/2022 | Prabhakar | G06F 1/3296 |

OTHER PUBLICATIONS

Anonymous, "Green Computing and Revenue Generation Model in Federated Environment", https://ip.com/IPCOM/000256105, Nov. 5, 2018; 7 Pages.

Anonymous, "Method and System for Optimizing Server-less Execution Environment for Cloud Service Providerst", https://ip.com/IPCOM/000257744, Mar. 7, 2019; 2 Pages.

Liu et al., "FaaSLight: General Application-Level Cold-Start Latency Optimization for Function-as-a-Service in Serverless Computing", https://github.com/WenJinfeng/FaaSLight, Feb. 6, 2023; 28 Pages.

Kulkarni et al., "Living on the Edge: Serverless Computing and the Cost of Failure Resiliency", Jul. 1-3, 2019; 6 Pages.

Akkus et al., "Sand: Towards High-Performance Serverless Computing", https://www.usenix.org/conference/atc18/presentation/akkus, Jul. 11-13, 2018; 14 Pages.

Suresh et al., "ServerMore: Opportunistic Execution of Serverless Functions in the Cloud", https://doi.org/10.1145/3472883.3486979, Nov. 1-4, 2021; 15 Pages.

Van et al., "Performance and Power Management for Cloud Infrastructures", https://ieeexplore.ieee.org/document/5557975, Jul. 5-10, 2010; 4 Pages, Abstract.

Hu et al., "Efficient Power Allocation under Global Power Cap and Application-Level Power Budget", https://ieeexplore.ieee.org/document/7979897, Nov. 16-18, 2016; 4 Pages, Abstract.

Mirhosseini et al., "µSteal: a theory-backed framework for preemptive work and resource stealing in mixed-criticality microservices", https://ieeexplore.ieee.org/abstract/document/8192467, Jun. 4, 2021; 13 Pages.

Yang et al., "PowerChief: Intelligent power allocation for multi-stage applications to improve responsiveness on power constrained CMP", https://ieeexplore.ieee.org/document/7979897, Jun. 24-28, 2017; 4 Pages, Abstract.

Chen et al., "ReTail: Opting for Learning Simplicity to Enable QoS-Aware Power Management in the Cloud", https://eeexplore.ieee.org/document/9773201, Apr. 2-6, 2022; 4 Pages, Abstract.

EMR., Global Serverless Computing Market: By Service: Professional, Managed; By Type: Hybrid Cloud, Multi-Cloud; By End User Industry: IT and Telecommunication, BFSI, Retail, Government, Industrial; Regional Analysis; Historical Market and Forecast (2018-2028); Market Dynamics; Competitive Landscape; Industry Events and Developments', https://www.expertmarketresearch.com/reports/serverless-computing-market/toc, 2022; 19 Pages.

Mordor Intelligence., "Serverless Computing Market Size & Share Analysis—Growth Trends & Forecasts (2023-2028)", https://www.mordorintelligence.com/industry-reports/serverless-computing-market, 2023; 7 Pages.

Ot., "The Serverless Computing Market in 2022", https://www.enterprisestorageforum.com/cloud/serverless-computing-market/, May 4, 2022; 7 Pages.

* cited by examiner

MANAGING POWER FOR SERVERLESS COMPUTING

BACKGROUND

Aspects of the present invention relate generally to serverless computing and, more particularly, to serverless computing to achieve service level objectives and power reduction.

Serverless computing (i.e., function-as-a-service) comprises a cloud service where computing resources are transparently provided on demand to run applications. Cloud service providers (CSP) are responsible for handling and maintaining a physical infrastructure and servers to support applications. In particular, software developers can use serverless computing to develop and execute code (i.e., functions) remotely without having to worry about the server environment. Further, end-users can consume services and applications which include functions through cloud invocations.

SUMMARY

In a first aspect of the invention, there is a computer-implemented method including: dynamically measuring, by a processor set, latency for a plurality of functions with a plurality of corresponding frequency levels within a serverless computing cluster; measuring, by the processor set, a transition latency from an idle state to an active state for the plurality of functions; determining, by the processor set, whether a target response time to perform a service level objective (SLO) within the serverless computing cluster is going to be missed; dynamically reallocating, by the processor set, at least one core and changing a frequency level across the plurality of functions by scaling down in response to a determination that the target response time to perform the SLO within the serverless computing cluster is going to be met; and dynamically reallocating, by the processor set, the at least one core and changing the frequency level across the plurality of functions by scaling up in response to a determination that the target response time to perform the SLO within the serverless computing cluster is going to be missed.

In another aspect of the invention, there is a computer program product including one or more computer readable storage media having program instructions collectively stored on the one or more computer readable storage media. The program instructions are executable to: measure power consumption needed to execute a function with a predetermined core frequency within a serverless computing cluster; store the power consumption needed to execute the function with the predetermined core frequency in at least one lookup table; determine that a power budget of the serverless computing cluster is going to be exceeded based on a number of cores and a next frequency level using the at least one lookup table; and perform at least one action of reducing a frequency, reducing the number of cores, and turning off at least one core of the cores in response to a determination that the power budget is going to be exceeded.

In another aspect of the invention, there is a system including a processor set, one or more computer readable storage media, and program instructions collectively stored on the one or more computer readable storage media. The program instructions are executable to: dynamically measure latency for a plurality of functions with a plurality of corresponding frequency levels within a serverless computing cluster; measure a transition latency from an idle state to an active state for the plurality of functions; determine whether a target response time to perform a service level objective (SLO) within the serverless computing cluster is going to be missed; dynamically reallocate at least one core and changing a frequency level across the plurality of functions by scaling down in response to a determination that the target response time to perform the SLO within the serverless computing cluster is going to be met; and dynamically reallocate the at least one core and change the frequency level across the plurality of functions by scaling up in response to a determination that the target response time to perform the SLO within the serverless computing cluster is going to be missed. The target response time includes a summation of the transition latency for the functions and the measured latency for the functions.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
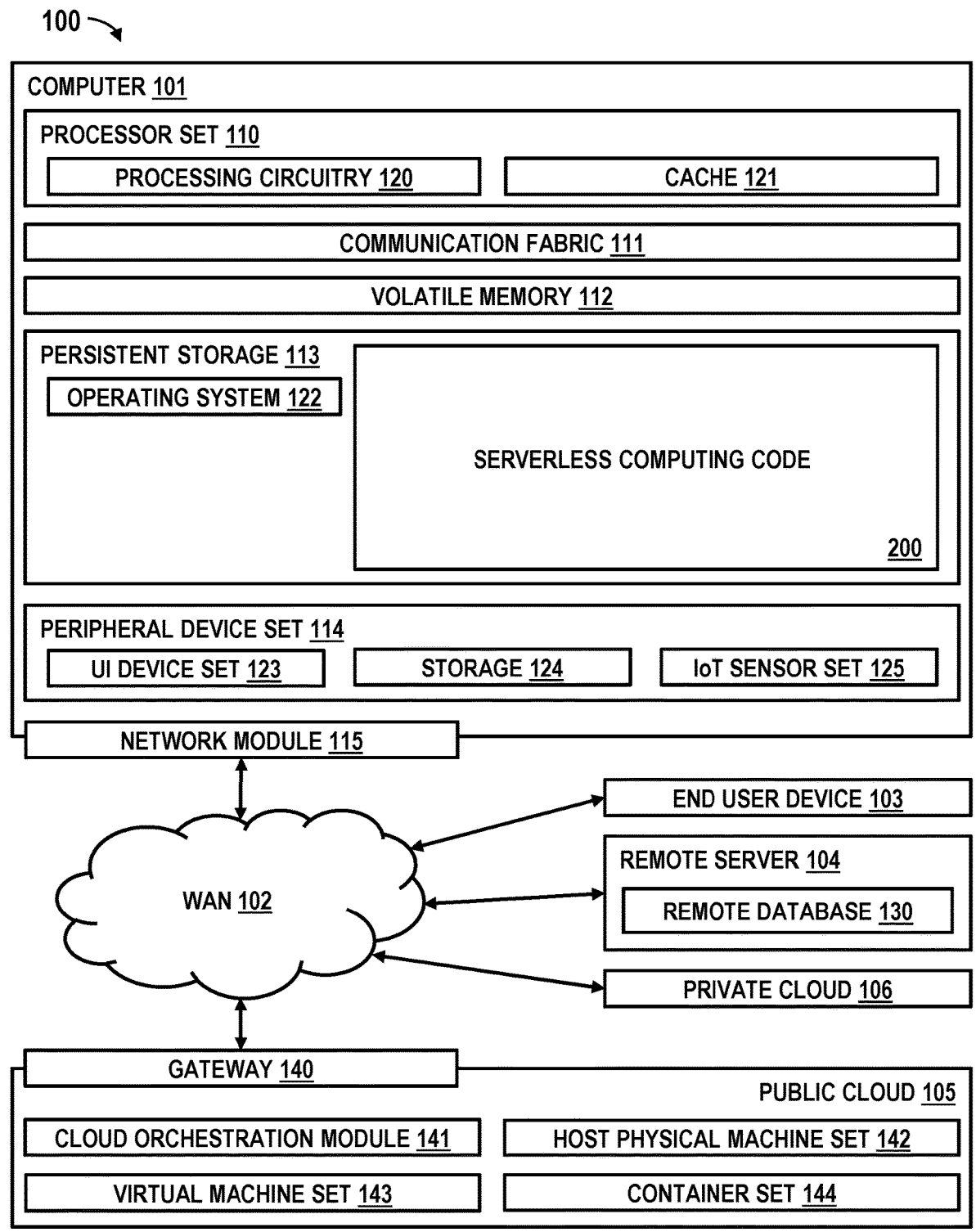
FIG. 1 depicts a computing environment according to an embodiment of the present invention.

Aspects of the present invention relate generally to serverless computing and, more particularly, to serverless computing to achieve service level objectives and power reduction. Embodiments of the present invention improve an operational efficiency, a potential load, and a user experience through at least one service level objective (SLO) of a serverless computing system in comparison to conventional cloud service provider (CSP) systems. Embodiments of the present invention reduce a power consumption per function and a carbon footprint in comparison to conventional CSP systems. Embodiments of the present invention minimize the cost of power consumption and a carbon footprint by operating at an optimal condition while also maintaining and handling all service level objectives (SLOs) required by a customer. In particular, aspects of the present invention monitor response times per function per class and scale cores assigned to functions and provide a frequency such that SLOs are not missed with reduced power consumption. Embodiments of the present invention provide a power and SLO aware function-as-a-service (FaaS) environment with dynamic power budget constraints. Embodiments of the present invention distribute power among different nodes of a FaaS cluster based on an overall power budget. In embodiments, the overall power budget of the FaaS cluster is allocated and is distributed across nodes in the FaaS cluster. Further, in embodiments, the power budget in each node in the FaaS cluster is distributed among different functions for each node. Embodiments of the present invention also handle power budget events in the serverless computing environment. Embodiments of the present invention also provide for gracefully degrading SLOs based on limited power budget constraints based upon a class prioritization. Further, embodiments of the present invention are also applicable to other systems, such as Ray. In particular, Ray is a distributed computing system designed for artificial intelligence (AI) and machine learning (ML) applications. In particular, embodiments of the present invention include ML functions which may be deployed transparently to nodes via load balancers/schedulers and node invokers within the Ray distributed computing system. Also, embodiments of the present invention include other disturbed computing systems and serverless computing systems.

Embodiments of the present invention reduce power consumption while meeting all application SLO deadlines, handle external power budget events, and provide a SLO prioritization. Embodiments of the present invention measure, in response to a new function arriving during a discovery phase at various discrete frequency and/or voltage levels, the response time of the new function invocation and a corresponding power consumption. Embodiments of the present invention also measure, in response to a verification of an existing function at various discrete frequency and/or voltage levels, the response time of the existing function invocation and a corresponding power consumption. Embodiments of the present invention dynamically analyze a relationship between a latency of a function and frequency and precisely attribute core power consumption to the function by dedicating at least one core to a container running a single function type. Embodiments of the present invention run multiple functions concurrently in a container since multiple cores may be assigned to the container. Embodiments of the present invention start another function in the container to keep a core busy when executing input/output functions. Embodiments of the present invention enable tracking an amount of power used to serve requests (e.g., SLOs) for a given function within a node. Embodiments of the present invention provide an average power usage per serviced request for a given function, which can be used as a billing component in public cloud infrastructure. Conventional systems typically overprovision resources to meet SLOs at all times, which can lead to significantly overprovisioning for the SLOs and a high power consumption. Further, conventional systems are not able to reduce and/or optimize power consumption while still meeting all of the SLOs required by the customer. Conventional systems typically operate at maximum frequency, which prevents optimization of certain serverless functions which do not require maximum frequency to operate efficiently. Further, when conventional systems operate at maximum frequency, power consumption is high and the cluster is frequently overprovisioned. In addition, conventional systems have applications which have different SLO requirements for each function, which result in overprovisioning and high power consumption. Embodiments of the present invention are directed to completing a SLO request within a deadline without overprovisioning. Embodiments of the present invention save power and operate at optimal conditions by scaling a number of cores and a frequency. In aspects of the present invention, processors of the serverless computing environment can power down subsystems (i.e., a C-state of the core/core power state) through an operating system and/or driver, reduce a frequency and/or voltage (i.e., an active P-state of the core/core state). In an example, when a core C0 is running in the serverless computing environment, a core C1 is placed in an idle mode and a core C2 is placed in a deep idle mode (i.e., a deep sleep mode). In this example, there is less power usage consumed by powering down other cores (e.g., a C-state of the core). In another example, an operating system and/or driver of the serverless computing environment may set the active P-state of the core such that a frequency and/or a power is changed.

Embodiments of the present invention reduce power consumption while meeting all SLO requirements, handle external power budget events, and provide a SLO prioritization. Accordingly, implementations of aspects of the present invention provide an improvement (i.e., technical solution) to a problem arising in the technical field of serverless computing. In particular, embodiments of the present invention include measuring function latency at different frequency or voltage levels during a discovery phase, creating scaling events in response to either a service level objection (SLO) violation being predicted or occurring or an overprovisioning being predicted or occurring, and the created scaling events either increase or decrease a number of cores and/or the frequency and voltage to dynamically address either the SLO violation being predicted or occurring or the overprovisioning being predicted or occurring. Also, embodiments of the present invention may not be performed in a human mind because aspects of the present invention comprise dynamically reducing power consumption while maintaining SLO requirements within the serverless computing environment. Further, these implementations of the present invention are necessarily rooted in computer technology because they improve the functioning of the computer.

Aspects of the present invention include a method, system, and computer program product for managing one or more service level objectives associated within a distributed computing system. For example, a computer-implemented method includes: creating at least one table; storing at least one function in a function table of the at least one table, the at least one function is associated with a plurality of applications residing on the distributed computing system; measuring latency data related to the at least one function at an initial time; storing the latency data into a latency table of the at least one function, the latency data comprises a CPU core frequency level, power consumption, service time, and response time; tracking the at least one function by continuously measuring the latency data after the initial time; comparing the latency data and determining whether at least one SLO will be missed; determining at least one optimal setting for the distributed computing system based on the comparison of the latency data and at least one prioritized rule; and executing the at least one optimal setting for the distributed computing system. The at least one prioritization rule of the computer-implemented method further includes tail latency being greater than or equal to a predetermined threshold (e.g., 0.9) multiplied by the at least one SLO and four tail latency regions.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as serverless computing code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
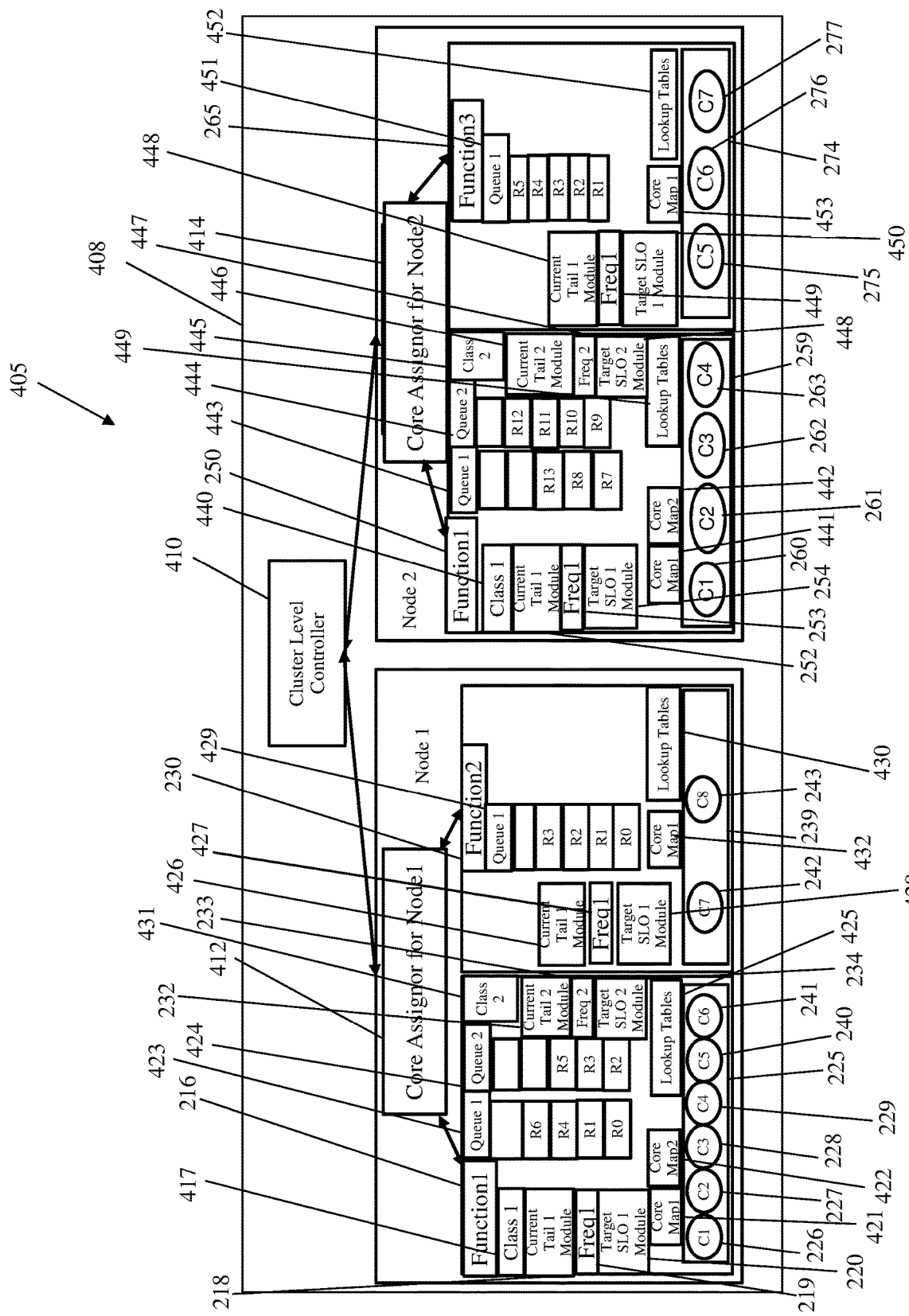
FIG. 2 shows a block diagram of an exemplary environment of a serverless computing cluster in accordance with aspects of the present invention.

FIG. 2 shows a block diagram of another exemplary embodiment of the serverless computing environment 405 in accordance with aspects of the invention. In embodiments, the serverless computing environment 405 includes a serverless computing cluster 408, which may comprise one or more instances of the computer 101 of FIG. 1. In other examples, the serverless computing cluster 408 comprises one or more virtual machines or one or more containers running on one or more instances of the computer 101 of FIG. 1.

Figure 8:
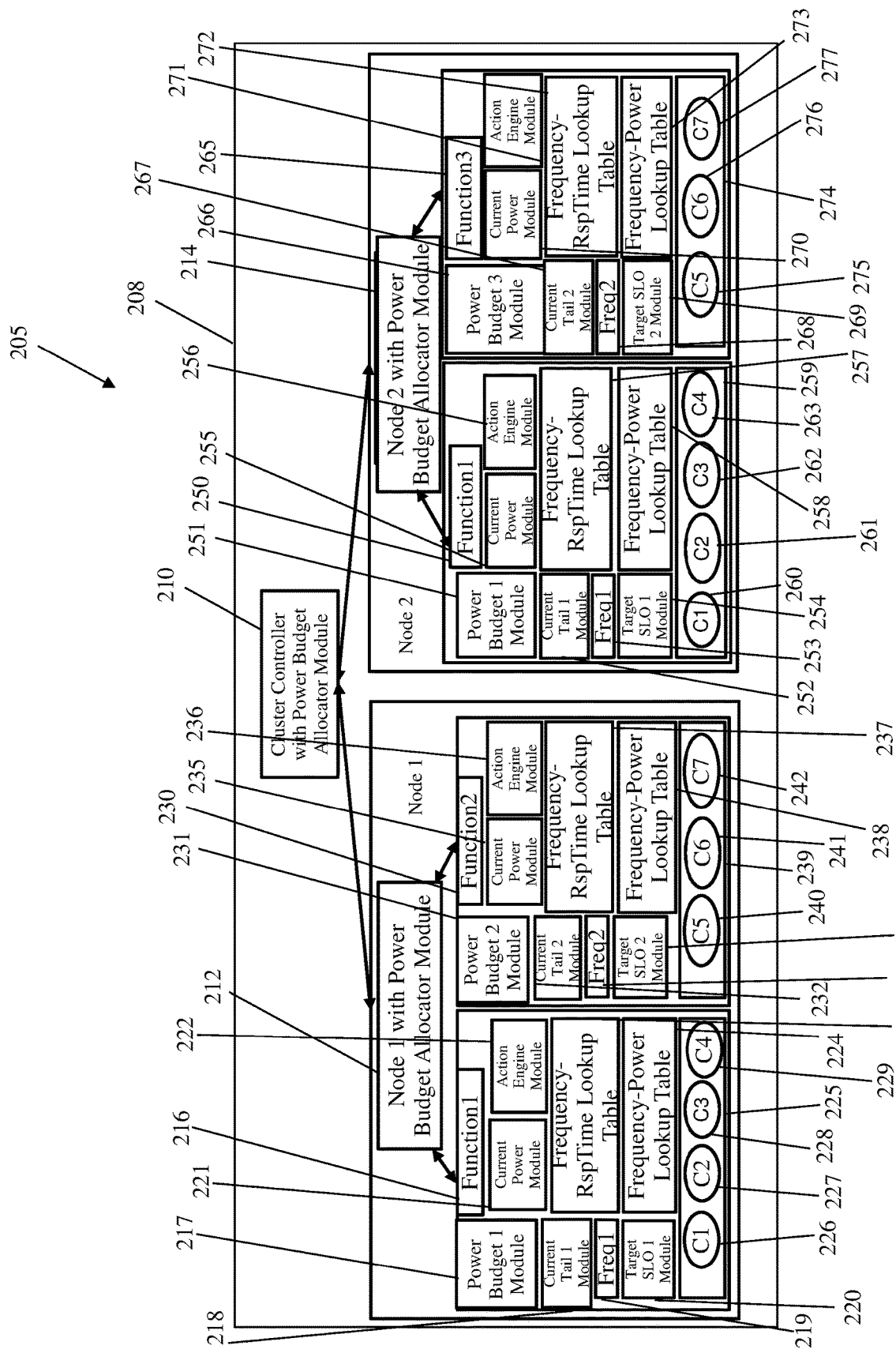
FIG. 8 shows a block diagram of another exemplary environment of the serverless computing cluster in accordance with aspects of the present invention.

In embodiments, the serverless computing cluster 408 of FIG. 2 comprises a cluster level controller 410 which communicates with a core assignor for node1 412 and a core assignor for node2 414, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The serverless computing cluster 408 may include additional or fewer modules than those shown in FIG. 2. Also, the serverless computing cluster 208 may include additional or fewer modules than those shown in FIG. 8. In embodiments, separate modules may be integrated into a single module. Additionally, or alternatively, a single module may be implemented as multiple modules. Moreover, the quantity of devices and/or networks in the environment is not limited to what is shown in FIGS. 2 and 8. In practice, the environment may include additional devices and/or networks; fewer devices and/or networks; different devices and/or networks; or differently arranged devices and/or networks than illustrated in FIGS. 2 and 8.

In FIG. 2, and in accordance with aspects of the invention, the cluster level controller 410 tracks a directed acyclic graph (DAG) application progress and communicates each of the individual functions (e.g., function1 216, function2 230, and function3 265) remaining service level objectives (SLO) that need to be performed for the corresponding functions. In embodiments, the DAG application is a mathematical representation or abstraction of a data pipeline or data workflow that is executed across the individual functions. In embodiments, since different functions might be used in different applications and are placed in different locations of the different applications, each of the different functions may have different urgencies and/or requirements to complete their SLO. Hence, in embodiments, each function container maintains necessary classes of the function and prioritizes based on a remaining slack (i.e., the time of the application represented by the DAG to complete minus the execution time of the remaining functions in the DAG) and accounts for the remaining slack in a frequency and/or core computation. In embodiments, each function container works on a most urgent priority and determines whether a predicted response time is going to miss the SLO and adjusts at least one of a frequency and/or core accordingly. Further, the core assignor for node1 412 shares cores (e.g., core C1 226, core C2 227, core C3 228, core C4 229, core C5 240, core C6 241, core C7 242, and core C8 243) across co-located functions (e.g., function1 216, function2 230) within node 1 and the core assignor for node2 414 shares cores (e.g., core C1 260, core C2 261, core C3 262, core C4 263, core C5 275, core C6 276, and core C7 277) across co-located functions (e.g., function1 250, function3 265) within node 2. In embodiments, the core assignor for node1 412 communicates with function1 216 and function2 230 of the node 1. In further embodiments, the core assignor for node2 414 communicates with function1 250 and function3 265. In embodiments, the node 1 shares cores (e.g., core C1 226, core C2 227, core C3 228, core C4 229, core C5 240, core C6 241, core C7 242, and core C8 243) and adjusts a frequency across different classes (e.g., class 1 417 and class 2 431). In a node (e.g., node 1 or node 2), requests for a same function type are handled by one function (e.g., function1 216 or function2 230). In embodiments, any cores that are not used by any function are set to a low-power C state or are turned off. Also, within each node, separate request queues (e.g., queue 1 423, queue 2 424) are maintained for different SLO classes (e.g., class 1 417, class 2 431).

In embodiments, the function1 216 of the node 1 comprises a class 1 218, a class 2 431, a current tail 1 module 218, a freq1 219 (i.e., a frequency 1 of the node 1), a target SLO 1 module 220, a core map1 421, a core map2 422, a queue 1 423 which includes sub-functions R6, R4, R1, and R0, a queue 2 424 which includes sub-functions R5, R3, and R2, a current tail 2 module 232, a freq2 233 (i.e., a frequency 2 of the node 1), a target SLO 2 module 234, lookup tables 425 (i.e., the lookup tables 425 comprise the frequency-rsptime lookup table 223 and the frequency-power lookup table 224), a core container module 225, core C1 226, core C2 227, core C3 228, core C4 229, core C5 240, and core C6 241. In particular, the current tail 1 module 218, the target SLO 1 module 220, the current tail 2 module 426, the target SLO 2 module 428, and the core container module 225 may comprise modules of the code of block 200 of FIG. 1.

In embodiments, the current tail 1 module 218 calculates a tail latency for the function1 216. In embodiments, the tail latency represents an upper percentile (e.g., 99%) of a response time. The target SLO 1 module 220 calculates a target response time to perform the SLO. The lookup tables 425 comprises the frequency-rsptime lookup table 223 which stores a response time for the function1 216 while executing with a predetermined core frequency and the frequency-power lookup table 224 which stores power consumption for the function1 216 while executing with the predetermined core frequency. The core map1 421 maps the class 1 417 to specific cores for the class 1 417 and the core map2 422 maps the class 2 431 to specific cores for the class 2 431. The core container module 225 includes a number of cores which are currently allocated for the function1 216. In FIG. 2, the core container module 225 includes the core C1 226, the core C2 227, the core C3 228, the core C4 229, the core C5 240, and the core C6 241. In embodiments, the core C1 226, the core C2 227, the core C3 228, the core C4 229, the core C5 240, and the core C6 241 are used to execute the function1 216.

In embodiments, the function2 230 of the node 1 comprises a current tail 1 module 426, a freq1 427 (i.e., a frequency 1 of the node 2), a target SLO 1 module 428, a queue 1 429 which includes sub-functions R3, R2, R1, and R0, a core map1 432, lookup tables 430 (i.e., the lookup tables 430 comprise the frequency-rsptime lookup table 237 and the frequency-power lookup table 238), a core container module 239, core C7 242, and core C8 243. In particular, the current tail 1 module 426, the target SLO 1 module 428, and the core container module 239 may comprise modules of the code of block 200 of FIG. 1.

In embodiments, the function2 230 of the node 1 performs similar operations and processes as the function1 216 of the node 1. In embodiments, the core container module 239 includes core C7 242 and core C8 243 (which is different from the core container module 225 of the function1 216 of the node 1). In embodiments, the core C7 242 and the core C8 243 are used to execute the function2 230 of the node 1. In embodiments, the function1 216 of the node 1 can be a same function as the function2 230 of the node 1. In other embodiments, the function1 216 of the node 1 can be a different function than the function2 230 of the node 1.

In embodiments, the function1 250 of the node 2 comprises a class 1 440, a class 2 445, a current tail 1 module 252, a current tail 2 module 446, a freq1 253 (i.e., a frequency 1 of the node 2), a freq2 447 (i.e., a frequency 2 of the node 2), a target SLO 1 module 254, a target SLO 2 module 448, a core map1 441, a core map2 442, lookup tables 449 (i.e., the lookup tables 449 comprise the frequency-rsptime lookup table 257 and the frequency-power lookup table 258), a queue 1 443 which comprises sub-functions R13, R8, and R7, a queue 2 444 which comprises sub-functions R12, R11, R10, and R9, a core container module 259, core C1 260, core C2 261, core C3 262, and core C4 263. In particular, the current tail 1 module 252, the current tail 2 module 446, the target SLO 1 module 254, the target SLO 2 module 448, and the core container module 259 may comprise modules of the code of block 200 of FIG. 1.

In embodiments, the function1 250 of the node 2 performs similar operations and processes as the function1 216 of the node 1. In embodiments, the core container module 259 includes core C1 260, core C2 261, core C3 262, and core C4 263 (which is different from the core container module 225 of the function1 216 of the node 1). In embodiments, the core C1 260, the core C2 261, the core C3 262, and the core C4 263 are used to execute the function1 250 of the node 2.

In embodiments, the function3 265 of the node 2 comprises a current tail 1 module 448, a freq1 449 (i.e., a frequency 1 of the node 2), a target SLO 1 module 450, a queue 1 451 which comprise sub-functions R5, R4, R3, R2, and R1, lookup tables 452 (i.e., the lookup tables 452 comprise the frequency-rsptime lookup table 272 and the frequency-power lookup table 273), a core map1 453, a core container module 274, core C5 275, core C6 276, and core C7 277.

In embodiments, the function3 265 of the node 2 performs similar operations and processes as the function1 216 of the node 1. In embodiments, the core container module 274 includes core C5 275, core C6 276, and core C7 277 (which is different from the core container module 225 of the function1 216 of the node 1). In embodiments, core C5 275, core C6 276, and core C7 277 are used to execute the function3 265 of the node 2.

In embodiments, one of the core assignor for node 1 412 and the core assignor for node2 414 dynamically measures latency for different functions (e.g., function1 216 of the node 1, function2 230 of the node 1, function1 250 of the node 2, and function3 265 of the node 2) at different frequency levels and maintains at least one lookup table of the lookup tables (e.g., lookup tables 425 of function1 216 of the node 1, lookup tables 430 of function2 230 of the node 1, lookup tables 449 of function1 250 of the node 2, lookup tables 452 of function3 265 of the node 2). Further, one of the core assignor for node 1 412 and the core assignor for the node2 414 also measures the transition latency from idle C-state (i.e., an idle state) to active P-state (i.e., an active state) for different functions (e.g., function1 216 of the node 1, function2 230 of the node 1, function1 250 of the node 2, and function3 265 of the node 2). Further, one of the core assignor for node1 412 and the core assignor for node2 414 determines the response time by summing the transition latency and the latency for different functions (e.g., execution/service time for different functions).

In embodiments, one of the core assignor for node1 412 and the core assignor for node2 414 tracks target and observed tail latency to dynamically detect when scaling is needed. In particular, one of the core assignor for node1 412 and the core assignor for node2 414 determines whether the observed tail latency is greater than, equal to, or lesser than the target latency. In particular, one of the core assignor for node1 412 and the core assignor for node2 414 reduces frequency or lends core to another class in response to the observed tail latency being less than the target latency. In embodiments, one of the core assignor for node1 412 and the core assignor for node2 414 reduces a frequency or lends at least one core to another class in response to the observed tail latency being less than the target latency. In addition, one of the core assignor for node1 412 and the core assignor for node2 414 increases a frequency or steals at least one core from another class in response to the observed tail latency being approximately equal to the target latency. Further, one of the core assignor for node1 412 and the core assignor for node 414 does not change the frequency or lend/steal cores in response to the observed tail latency being more than the target latency (i.e., one of the core assignor for node1 412 and the core assignor for node 414 does not perform any dynamic scaling).

In embodiments, one of the core assignor for node 1 412 and the core assignor for node2 414 proactively predicts a SLO miss (i.e., predicts when the queuing and servicing time for the SLO is likely to be missed). In other words, one of the core assignor for node1 412 and the core assignor for node2 414 proactively detects when a target response time to perform the SLO is going to be missed. Further, one of the core assignor for node1 412 and the core assignor for node 412 dynamically reallocates cores and changes a frequency level across different functions in response to proactively predicting the SLO miss. Further, although one of the core assignor for node1 412 and the core assignor for node2 414 is described as proactively predicting the SLO miss, embodiments are not limited. In other embodiments, one of the core assignor for node1 412 and the core assignor for node2 414 detects the SLO missed after it occurs (i.e., reactively detects that the target response time to perform the SLO was missed). In this situation, one of the core assignor for node1 412 and the core assignor for node 412 also dynamically reallocates at least one core and changes a frequency level across different functions in response to detecting the SLO miss after it occurs.

Figure 3:
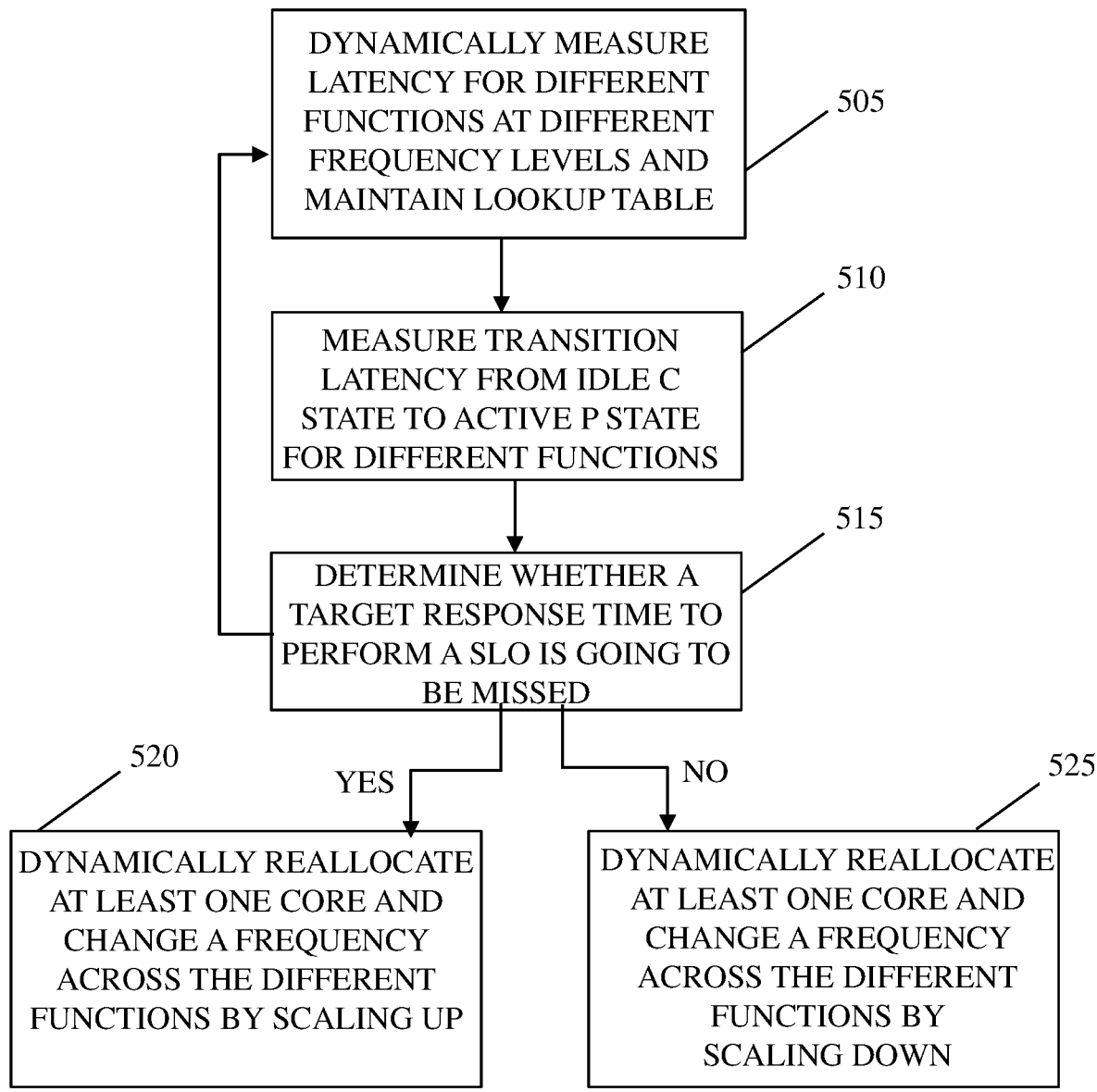
FIG. 3 shows a flowchart of an exemplary method of the serverless computing cluster in accordance with aspects of the present invention.

FIG. 3 shows a flowchart of an exemplary method of the value obscuring module in accordance with aspects of the present invention. Steps of the method may be carried out in the environment of FIG. 2 and are described with reference to elements depicted in FIG. 2.

At step 505, the system dynamically measures, at one of the core assignor for node1 412 and the core assignor for node2 414, latency for different functions (e.g., function1 216 of the node 1, function2 230 of the node 1, function1 250 of the node 2, and function3 265 of the node 2) at different frequency levels and maintains at least one lookup table of the lookup tables (e.g., lookup tables 425 of function1 216 of the node 1, lookup tables 430 of function2 230 of the node 1, lookup tables 449 of function1 250 of the node 2, lookup tables 452 of function3 265 of the node 2). At step 510, the system measures, at one of the core assignor for node1 412 and the core assignor for node2 414, the transition latency from idle C-state (i.e., an idle state) to active P-state (i.e., an active state) for different functions (e.g., function1 216 of the node 1, function2 230 of the node 1, function1 250 of the node 2, and function3 265 of the node 2). In embodiments, and as described with respect to FIG. 2, one of the core assignor for node1 412 and the core assignor for node2 414 determines the response time by summing the transition latency and the latency for different functions (e.g., execution/service time for different functions).

At step 515, the system proactively detects, at one of the core assignor for node1 412 and the core assignor for node2 414, whether the target response time to perform the SLO is going to be missed. If the system determines, at one of the core assignor for node1 412 and the core assignor for node2 414, that the target response time to perform the SLO is going to be missed, the method proceeds to step 520. If the system determines, at one of the core assignor for node1 412 and the core assignor for node2 414, that the target response time to perform the SLO is not going to be missed (i.e., the SLO is going to be met), the method proceeds to step 525.

At step 520, the system dynamically reallocates, at one of the core assignor for node1 412 and the core assignor for node2 414, at least one core and changes a frequency level across different functions (e.g., function1 216 of the node 1, function2 230 of the node 1, function1 250 of the node 2, and function3 265 of the node 2) in response to a determination that the target response time to perform the SLO is going to be missed. In embodiments, and as described with respect to FIG. 2, the system performs, at one of the core assignor for node1 412 and the core assignor for node2 414, scaling up by at least one of increasing a frequency and at least one core stealing in response to a prediction that the SLO is going to be missed. In other embodiments, the system performs, scaling up by starting a new container that will be placed on a different node in response to a frequency already running at a high level and all cores being utilized.

At step 525, the system dynamically reallocates, at one of the core assignor for node1 412 and the core assignor for node2 414, at least one core and changes a frequency level across different functions (e.g., function1 216 of the node 1, function2 230 of the node 1, function1 250 of the node 2, and function3 265 of the node 2) in response to a determination that the target response time to perform the SLO is going to be met. In embodiments, and as described with respect to FIG. 2, the system performs, at one of the core assignor for node1 412 and the core assignor for node2 414, scaling down by at least one of decreasing a frequency and at least one core lending in response to a prediction that the SLO is going to be met. In further embodiments, the system performs, at one of the core assignor for node1 412 and the core assignor for node2 414, scaling down by at least one of decreasing a frequency and at least one core lending to provide just enough computing power for executing different functions while still meeting the SLO. In other embodiments, the system performs, scaling down by turning off a core in response to a frequency already running at a low level to provide just enough computing power for executing different functions while still meeting the SLO. In embodiments, the system reduces power consumption.

Figure 4:
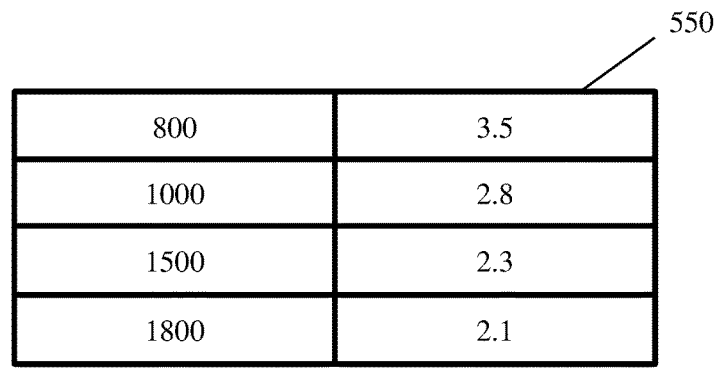
FIG. 4 shows a frequency response time lookup table, a frequency power lookup table, and a combined frequency response time power lookup table in accordance with aspects of the present invention.
Figure 4:
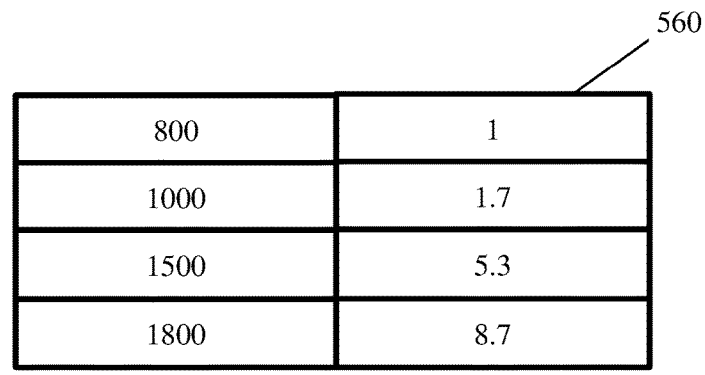
Figure 4:
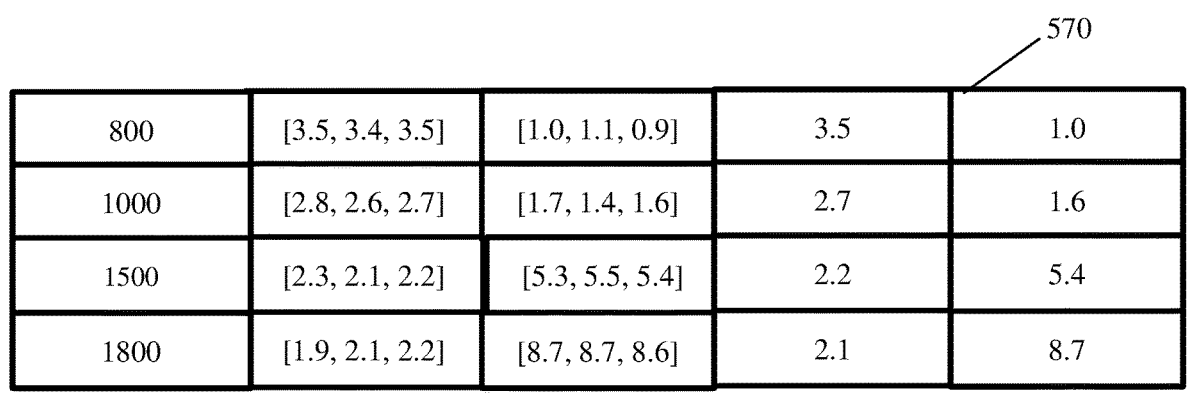

FIG. 4 shows a frequency response time lookup table, a frequency power lookup table, and a combined frequency response time power lookup table in accordance with aspects of the present invention. In particular, the frequency response time lookup table 550 (which corresponds to one of the frequency-rsptime lookup table 223, the frequency-rsptime lookup table 237, the frequency-rsptime lookup table 257, and the frequency-rsptime Lookup Table 272) has a first column which lists the frequency in MHz and a second column which lists the average response time in seconds. Further, one of the core assignor for node1 412, the core assignor for node2 414, the action engine module 222, the action engine module 236, the action engine module 256, and the action engine module 271 measures an average response time needed to execute corresponding functions over a plurality of times and stores the average response time at a given frequency in the frequency response time lookup table 550.

In embodiments, in FIG. 4, the frequency power lookup table 560 (which corresponds to one of the frequency-power lookup table 224, the frequency-power lookup table 238, the frequency-power lookup table 258, the frequency-power lookup table 273) has a first column which list the frequency in MHz and a second column which lists the average power in watts. Further, one of the core assignor for node1 412, the core assignor for node2 414, the action engine module 222, the action engine module 236, the action engine module 256, and the action engine module 271 measures an average power needed to execute corresponding functions over a plurality of times and stores the average power at a given frequency in the frequency power lookup table 560.

In embodiments, in FIG. 4, a combined frequency response time power lookup table 570 may be populated with a first column which lists the frequency in MHz, a second column which lists a history of response times in seconds, a third column which lists a history of power in watts, a fourth column which lists the average response time in seconds, and a fifth column which lists the average power in watts. In the combined frequency response time power lookup table 570, the history and average data can be populated over integer N requests (which can define a sliding window for the history and average data). Accordingly, the combined frequency response time power lookup table 570 stores history and average data over integer N requests and may be used to detect dynamic changes over the integer N requests for making dynamic changes to frequency and allocated cores. However, embodiments are not limited. In other embodiments, the combined frequency response time power lookup table 570 can include exponential decays of the history of response time and power.

Figure 5:
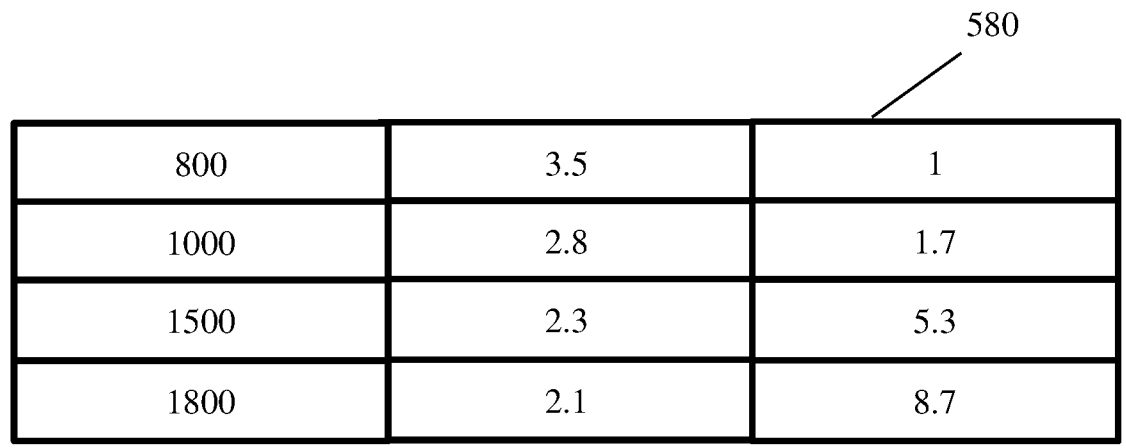
FIG. 5 shows core type tables in accordance with aspects of the present invention.
Figure 5:

FIG. 5 shows core type tables in accordance with aspects of the present invention. In particular, a core type 1 per function table 580 (e.g., any one core of cores C1 226, core C2 227, core C3 228, core C4 229, core C5 240, core C6 241, core C7 C242, core C1 260, core C2 261, core C3 262, core C4 263, core C5 275, core C6 276, and core C7 277) may be populated with a first column which lists the frequency in MHz, a second column which lists the average response time in seconds, and a third column which lists the average power in watts for that particular core per function. Another core type per function table 590 may be populated with the first column which lists the frequency in MHz, the second column which lists the average response time in seconds, and a third column which lists the average power in watts for that particular core per function. In other words, FIG. 5 shows core type per function tables 580, 590 which can be used by one of the core assignor for node1 412, the core assignor for node2 414, the action engine module 222, the action engine module 236, the action engine module 256, and the action engine module 271 to dynamically reallocate cores based on an available power budget and SLO. In particular, core type per function tables 580, 590 are needed because there can be different type of allocated cores (i.e., small cores, big cores, etc.).

Figure 6:
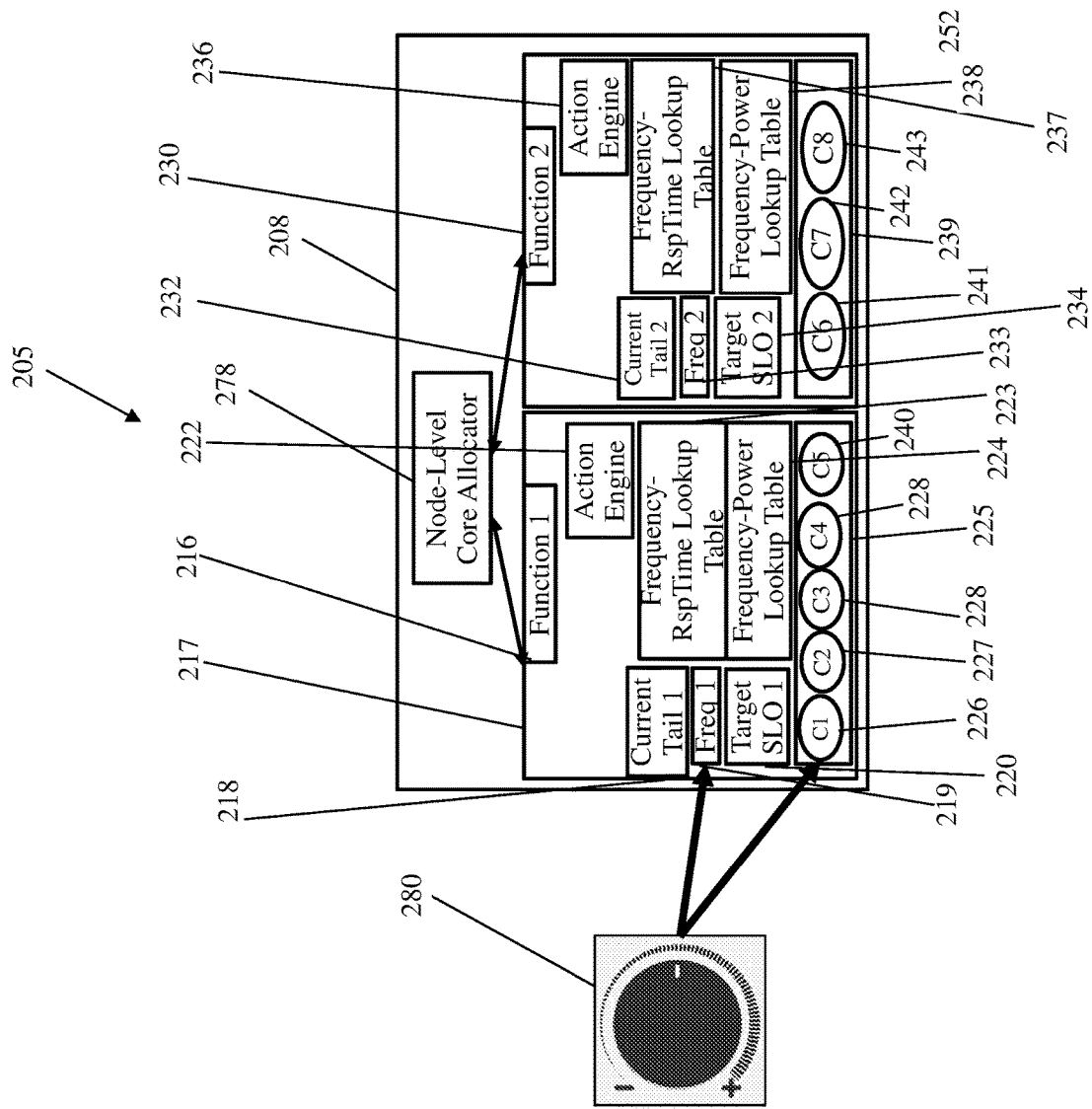
FIG. 6 shows a block diagram of the exemplary environment of the serverless computing node in accordance with aspects of the present invention.

FIG. 6 shows a block diagram of the exemplary environment of the serverless computing node in accordance with aspects of the present invention. FIG. 6 is similar to the serverless computing environment 205 with the serverless computing cluster 208 of FIG. 8 with the exception of a node-level controller 278 instead of the node 1 with power budget allocator module 212. Also, FIG. 6 does not include the power budget 1 module 217, the power budget 2 module 231, the power budget 1 module 251, the power budget 3 module 266, the current power module 221, the current power module 235, the current power module 255, and the current power module 270. In addition, in FIG. 6, a dynamic scaler 280 is included to scale up the serverless computing cluster 208 by increasing a frequency and/or steal some cores. In FIG. 6, the dynamic scaler 280 finds an optimal setting which the SLO is not going to be violated (i.e., a target response time to perform the SLO is going to be met) while using minimal power by taking into account the combined frequency response time power lookup table 570 and the core type per function tables 580, 590. In particular, the dynamic scaler 280 uses the following equation:

$$\text{Execution Time } (f) * ((\text{queue length}/\text{number of cores}) + 1) \le SLO, \quad \text{(Eq. 1)}$$
$$\text{with min power } (f) * \text{num of cores}.$$

In embodiments, based on Equation 1, the dynamic scaler 280 predicts if the SLO is going to be violated. The dynamic scaler 280 will perform at least one of increasing a frequency and stealing cores in response to the dynamic scaler 280 predicting whether the SLO is going to be violated. In embodiments of FIG. 8, the dynamic scaler 280 communicates with the action engines 222 and 236 for predicting if the SLO is going to be violated. In the example of FIG. 8, the dynamic scaler 280 instructs the node-level core allocator 278 to allow function1 216 to steal core C5 240 from function2 230 (i.e., compare the core allocation of core C5 240 in FIG. 6 to the core allocation of core C5 240 in FIG. 8). In embodiments, the dynamic scaler 280 will scale down (i.e., reduce a frequency and/or lend some cores) in response to the SLO is not being violated (i.e., the SLO being met).

Figure 7:
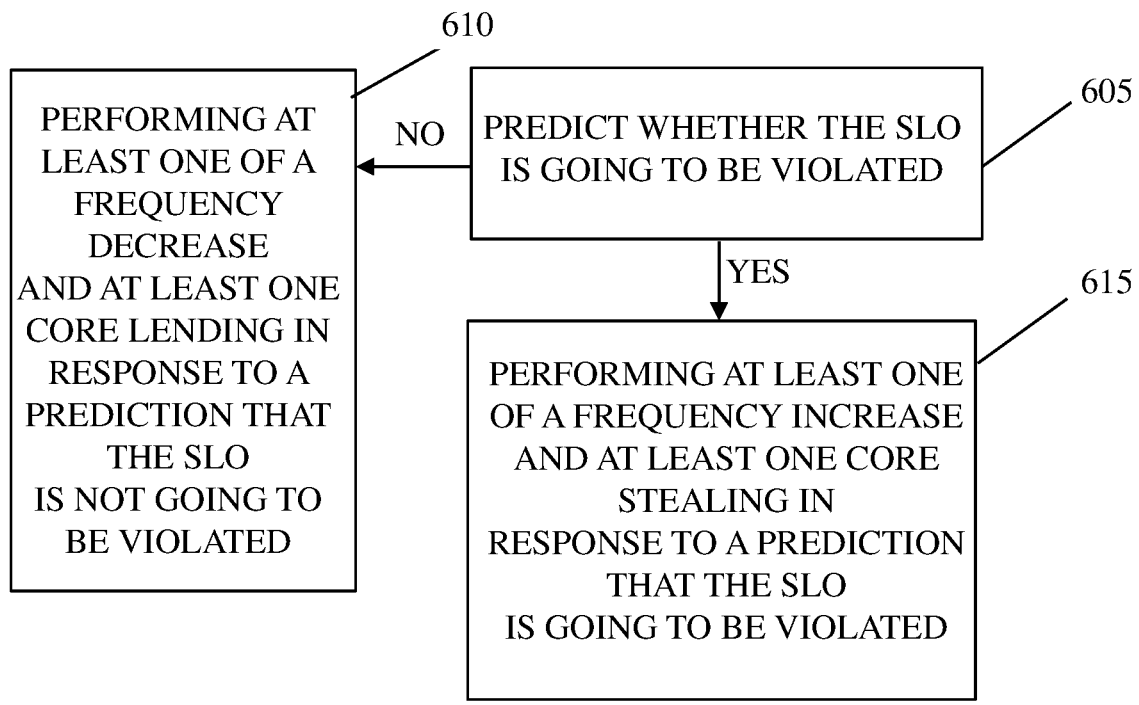
FIG. 7 shows a flowchart of an exemplary method of the serverless computing node in accordance with aspects of the present invention.

FIG. 7 shows a flowchart of an exemplary method of the serverless computing node in accordance with aspects of the present invention. Steps of the method may be carried out in the environment of FIG. 6 and are described with reference to elements depicted in FIG. 6.

At step 605, the system predicts, at the dynamic scaler 280, whether the SLO is going to be violated (e.g., a target response time to perform the SLO is going to be missed). In embodiments, and as described with respect to FIG. 6, the dynamic scaler 280 communicates with the action engines 222 and 236 for predicting if the SLO is going to be violated. In response to the dynamic scaler 280 predicting that the SLO is not going to be violated (i.e., a target response time to perform the SLO is going to be met), the process moves to step 610. In response to the dynamic scaler 280 predicting that the SLO is going to be violated, the process moves to step 615.

At step 610, the system performs, at the dynamic scaler 280, at least one of a frequency decrease and at least one core lending in response to a prediction that the SLO is not going to be violated (i.e., the SLO is going to be met). In embodiments, and as described with respect to FIG. 8, the dynamic scaler 280 instructs the node-level core allocator 278 to lend cores and/or decrease a frequency.

At step 615, the system performs, at the dynamic scaler 280, at least one of a frequency increase and at least one core stealing in response to a prediction that the SLO is going to be violated. In embodiments, and as described with respect to FIG. 8, the dynamic scaler 280 instructs the node-level core allocator 278 to steal cores and/or increase a frequency.

In embodiments, functions and applications come with multiple different SLOs. In response to a demand outstripping an allocated power budget, an SLO can be missed. In embodiments, in response to a prediction that the SLO is going to be missed, either a customer or a cloud service provider (CSP) determines how classes are prioritized. In an example, a system of the embodiments degrades a lower priority class. In another example, the system of the embodiments degrades classes based on a weighted share. As described herein above, the system of the embodiments performs power efficiency trading through core and/or frequency scaling to ensure that the SLO is not going to be missed (i.e., a target response time to perform the SLO is going to be met).

In embodiments, a state is defined by a number of cores, a current frequency, a number of requests in a queue, and an output of the state is an expected tail latency. In response to the expected tail latency being higher than a required SLO, action needs to be taken. In embodiments, the system needs to transition to another state which has a tail latency lower than or equal to the SLO. For example, a transition function which transforms a current state to a next state may perform changing a number of cores, changing a frequency level, or a combination of changing the number of cores, and changing the frequency level. In embodiments, the transition function from current state to next state can use table lookups as described herein and can also use machine learning to transition to the next state which has a tail latency lower or equal to the SLO.

In embodiments, if a tail latency≥0.9*SLO, the system of the embodiments can perform the following actions:
1. Try to increase frequency for cores of a given class (i.e., 800, 1000, 1200, 1500, 1800, 2000 MHz).
2. Try to steal a core from another class without modifying frequency of the other class (Final Tail<0.6*SLO).
3. Try to steal a core from another class with modifying the frequency of the other class (Final Tail<0.8*SLO).
4. Try to activate turbo-boost (i.e., allows the core to operate at a higher frequency).
5. Try to steal a core from another function on a same node.
6. Need to auto-scale by creating a new instance on another node.

In embodiments, if 0<tail<0.6*SLO, the system of the embodiments can reduce frequency, lend core to another class, lend core to another function, send a core to an idle-sleep state, power core off, etc. In embodiments, if 0.6*SLO<tail<0.8*SLO, the system of the embodiments can lend a core to another class and increase frequency. In embodiments, if 0.8*SLO<tail<0.9*SLO, the system of the embodiments is safe to operate such that no changes are allowed or needed. If 0.9*SLO<tail<SLO, the system of the embodiments needs to act as described above because the SLO is about to be exceeded. However, embodiments are not limited. In other embodiments, system can configure and set other numeric values of the tail latency levels in comparison to the SLO.

FIG. 8 shows a block diagram of another serverless computing environment 205 in accordance with aspects of the invention. In embodiments, the serverless computing environment 205 includes a serverless computing cluster 208, which may comprise one or more instances of the computer 101 of FIG. 1. In other examples, the serverless computing cluster 208 comprises one or more virtual machines or one or more containers running on one or more instances of the computer 101 of FIG. 1.

In embodiments, the serverless computing cluster 208 of FIG. 8 comprises a cluster controller with power budget allocator module 210 which communicates with the node 1 with power budget allocator module 212 and the node 2 with power budget allocator module 214, each of which may comprise modules of the code of block 200 of FIG. 1.

In FIG. 8, and in accordance with aspects of the invention, the cluster controller with power budget allocator module 210 allocates the power budget across nodes (e.g., the node 1 with power budget allocator module 212 and the node 2 with power budget allocator module 214). Further, the node 1 with power budget allocator module 212 allocates the power budget across the node 1 and the node 2 with power budget allocator module 214 allocates the power budget across node 2. In embodiments, the node 1 with power budget allocator module 212 communicates with function1 216 and function2 230 of the node 1. In further embodiments, node 2 with power budget allocator module 214 communicates with function1 250 and function3 265.

In embodiments, the function1 216 of the node 1 comprises a power budget 1 module 217, a current tail 1 module 218, a freq1 219 (i.e., a frequency 1 of the node 1), a target SLO 1 module 220, a current power module 221, an action engine module 222, a frequency-rsptime lookup table 223 (i.e., a frequency response time look up table 223), a frequency-power lookup table 224 (i.e., a frequency power look up table 224), a core container module 225, core C1 226, core C2 227, core C3 228, and core C4 229. In particular, the power budget 1 module 217, the current tail 1 module 218, the target SLO 1 module 220, the current power module 221, the action engine module 222, and the core container module 225 may comprise modules of the code of block 200 of FIG. 1.

In embodiments, the power budget 1 module 217 allocates the power budget across the function1 216. The current tail 1 module 218 calculates a tail latency for the function1 216. In embodiments, the tail latency represents an upper percentile (e.g., 99%) of a response time. The target SLO 1 module 220 calculates a target response time to perform the SLO. The current power module 221 calculates a current power for the function1 216. The frequency-rsptime lookup table 223 stores a response time for the function1 216 while executing with a predetermined core frequency. The frequency-power lookup table 224 stores power consumption for the function1 216 while executing with the predetermined core frequency. The core container module 225 includes a number of cores which are currently allocated for the function1 216. In FIG. 8, the core container module 225 includes the core C1 226, the core C2 227, the core C3 228, and the core C4 229. In embodiments, the core C1 226, the core C2 227, the core C3 228, and the core C4 229 are used to execute the function1 216.

In embodiments, the action engine module 222 dynamically performs power budgeting for the function1 216. Initially, the power budget is equally distributed to all nodes, and further equally distributed to each running function for each node. In particular, the action engine module 222 measures power consumption needed to execute the function1 216 with the predetermined core frequency. Further, the action engine module 222 stores the measured power consumption in the frequency-power lookup table 224. The action engine module 222 also determines whether the target response time to perform the SLO is going to be missed based on the calculated values (i.e., the tail latency for the function1 216 and the target response time to perform the SLO) from the current tail 1 module 218 and the target SLO 1 module 220. In response to the action engine module 222 determining that the target response time to perform the SLO is going to be missed, the action engine module 222 determines if the power budget is going to be exceeded based on the number of cores and a next frequency level using the lookup tables (the frequency-rsptime lookup table 223 and the frequency-power lookup table 224). In particular, the action engine module 222 determines if the power budget is going to be exceeded based on Equations 2-5 below:

current state = function (Eq. 2)

(number of cores, current frequency, length of request queue);

next frequency = action table (Current state, *SLO*); (Eq. 3)

power per core = frequency- (Eq. 4)

power lookup table 224 (next frequency);

power per function = number of cores * power per core. (Eq. 5)

In Equation 2 above, the action engine module 222 includes an action table which determines a next frequency level based on the current state and the SLO. Further, the action engine module 222 compares the power per function in Equation 4 to an allocated power budget for the function1 216 to determine if the power budget is going to be exceeded for the function1 216.

Alternatively, in response to a determination that the allocated power budget does not allow for frequency scaling (e.g., increasing or decreasing a frequency to match the allocated power budget while still maintaining the SLO), the action engine module 222 attempts to steal power budget from another function (e.g., function2 230) on the same node (e.g., the node 1). However, in response to the action engine module 222 not being able to steal power budget from another function on the same node, the action engine module 222 attempts to steal power budget from another node (e.g., node 2). The action engine module 222 steals power budget based on Equations 6-8 below:

Node 1 with Power Budget Allocator Module 212: (Eq. 6)

Find function with current function power < function power budget;

Cluster Controller with Power Budget Allocator Module 210: (Eq. 7)

Find node with current node power < node power budget;

Current Node Power = (Eq. 8)

$\sum$ current function power (for all functions on that node).

In embodiments, in response to the current power exceeding the allocated budget for the function, the action engine module 222 performs at least one action of reducing a frequency, reducing a number of cores, and turning off at least one core (i.e., put at least one core into a deep sleep or a deep C-state). In response to the current power not exceeding the allocated budget for the function, the action engine module 222 performs at least one action of increasing a frequency and increasing a number of cores. The same processes as the action engine module 222 may also be performed for the action engine module 236, the action engine module 256, and the action engine module 271.

In embodiments, the function2 230 of the node 1 comprises a power budget 2 module 231, a current tail 2 module 232, a freq2 233 (i.e., a frequency 2 of the node 2), a target SLO 2 module 234, a current power module 235, an action engine module 236, a frequency-rsptime lookup table 237 (i.e., a frequency response time look up table 237), a frequency-power lookup table 238 (i.e., a frequency power look up table 238), a core container module 239, core C5 240, core C6 241, and core C7 242. In particular, the power budget 2 module 231, the current tail 2 module 232, the target SLO 2 module 234, the current power module 235, the action engine module 236, and the core container module 239 may comprise modules of the code of block 200 of FIG. 1.

In embodiments, the function2 230 of the node 1 performs similar operations and processes as the function1 216 of the node 1. In embodiments, the core container module 239 includes core C5 240, core C6 241, and core C7 242 (which is different from the core container module 225 of the function1 216 of the node 1). In embodiments, the core C5 240, the core C6 241, and the core C7 242 are used to execute the function2 230 of the node 1.

In embodiments, the function1 250 of the node 2 comprises a power budget 1 module 251, a current tail 1 module 252, a freq1 253 (i.e., a frequency 1 of the node 2), a target SLO 1 module 254, a current power module 255, an action engine module 256, a frequency-rsptime lookup table 257 (i.e., a frequency response time look up table 257), a frequency-power lookup table 258 (i.e., a frequency power look up table 258), a core container module 259, core C1 260, core C2 261, core C3 262, and core C4 263. In particular, the power budget 1 module 251, the current tail 1 module 252, the target SLO 1 module 254, the current power module 255, the action engine module 256, and the core container module 259 may comprise modules of the code of block 200 of FIG. 1.

In embodiments, the function1 250 of the node 2 performs similar operations and processes as the function1 216 of the node 1. Thus, the detailed description of the power budget 1 module 251, the current tail 1 module 252, the freq1 253 (i.e., a frequency 1 of the node 2), the target SLO 1 module 254, the current power module 255, the action engine module 256, the frequency-rsptime lookup table 257 (i.e., a frequency response time look up table 257), and the frequency-power lookup table 258 (i.e., a frequency power look up table 258) will not be repeated. In embodiments, the core container module 259 includes core C1 260, core C2 261, core C3 262, and core C4 263 (which is similar to the core container module 225 of the function1 216 of the node 1). In embodiments, the core C1 260, the core C2 261, the core C3 262, and the core C4 263 are used to execute the function1 250 of the node 2. In embodiments, the function1 216 of the node 1 can be a same function as the function1 250 of the node 2. In other embodiments, the function1 216 of the node 1 can be a different function than the function1 250 of the node 2.

In embodiments, the function3 265 of the node 2 comprises a power budget 3 module 266, a current tail 2 module 267, a freq2 268 (i.e., a frequency 2 of the node 2), a target SLO 2 module 269, a current power module 270, an action engine module 271, a frequency-rsptime lookup table 272 (i.e., a frequency response time look up table 272), a frequency-power lookup table 273 (i.e., a frequency power look up table 273), a core container module 274, core C5 275, core C6 276, and core C7 277. In particular, the power budget 3 module 266, the current tail 2 module 267, the target SLO 2 module 269, the current power module 270, the action engine module 271, and the core container module 274 may comprise modules of the code of block 200 of FIG. 1.

In embodiments, the function3 265 of the node 2 performs similar operations and processes as the function1 216 of the node 1. Thus, the detailed description of the power budget 3 module 266, the current tail 2 module 267, the freq2 268 (i.e., a frequency 2 of the node 2), the target SLO 2 module 269, the current power module 270, the action engine module 271, the frequency-rsptime lookup table 272 (i.e., a frequency response time look up table 272), and the frequency-power lookup table 273 (i.e., a frequency power look up table 273) will not be repeated. In embodiments, the core container module 274 includes core C5 275, core C6 276, and core C7 277 (which is different from the core container module 225 of the function1 216 of the node 1). In embodiments, core C5 275, core C6 276, and core C7 277 are used to execute the function3 265 of the node 2. In embodiments, the function1 216 of the node 1 can be a same function as the function3 265 of the node 2. In other embodiments, the function1 216 of the node 1 can be a different function than the function3 265 of the node 2.

Figure 9:
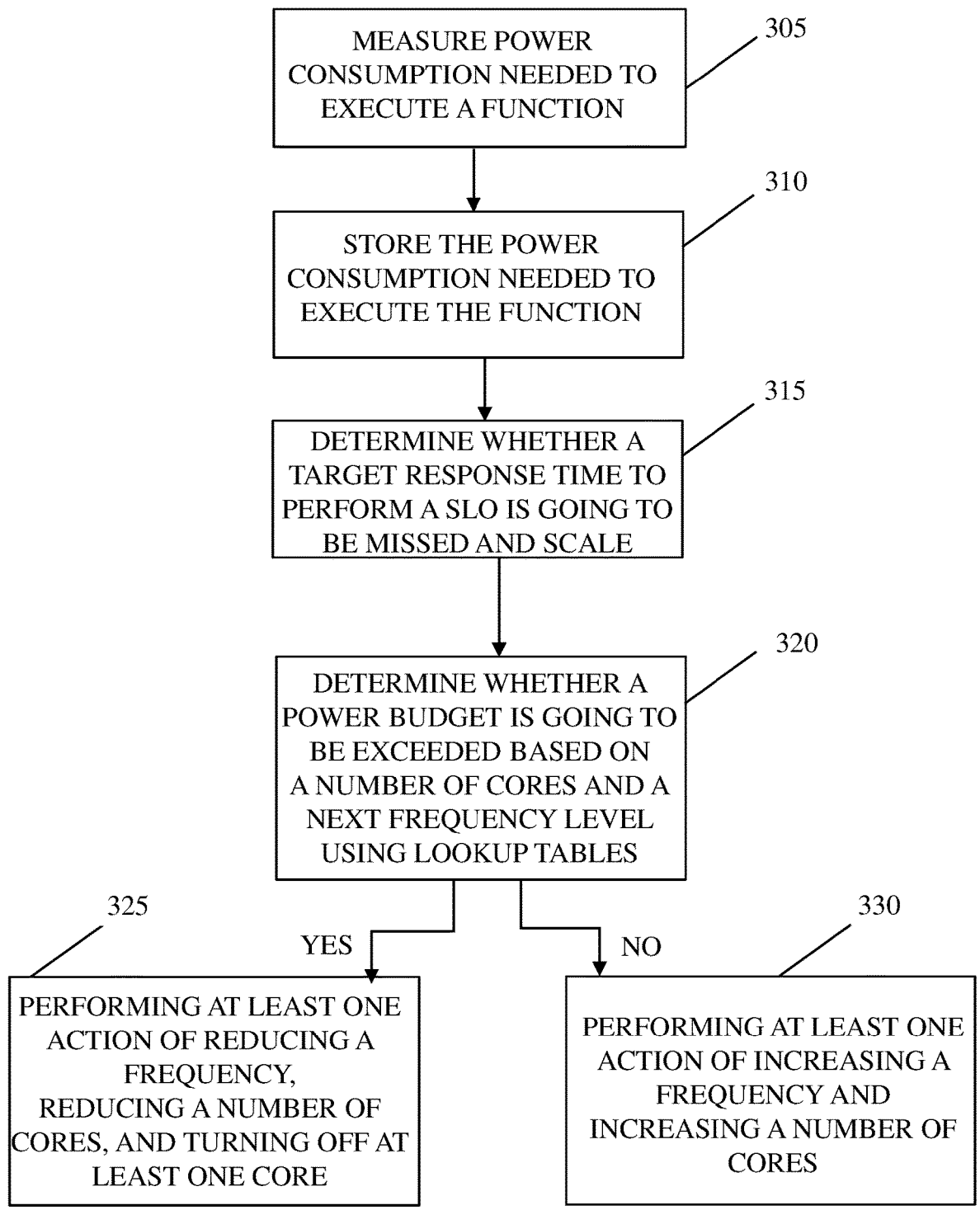
FIG. 9 shows a flowchart of another exemplary method of the serverless computing cluster in accordance with aspects of the present invention.

FIG. 9 shows a flowchart of an exemplary method of the serverless computing cluster in accordance with aspects of the present invention. Steps of the method may be carried out in the environment of FIG. 8 and are described with reference to elements depicted in FIG. 8.

At step 305, the system measures, at one of the action engine module 222, the action engine module 236, the action engine module 256, and the action engine module 271, power consumption needed to execute a function (e.g., the function1 216) with a predetermined core frequency. At step 310, the system stores, at one of the action engine module 222, the action engine module 236, the action engine module 256, and the action engine module 271, the measured power consumption needed to execute the function in the frequency-power lookup table 224. At step 315, the system determines, at one of the action engine module 222, the action engine module 236, the action engine module 256, and the action engine module 271, whether the target response time to perform the SLO is going to be missed. In embodiments, at step 315, the system scales, at one of the action engine module 222, the action engine module 236, the action engine module 256, and the action engine module 271, up in response to a determination that the target response time to perform the SLO is going to be missed (similar to step 520 in FIG. 3). In further embodiments, at step 315, the system scales, at one of the action engine module 222, the action engine module 236, the action engine module 256, and the action engine module 271, down in response to a determination that the target response time to perform the SLO is going to be met (similar to step 525 in FIG. 3).

At step 320, the system determines, at one of the action engine module 222, the action engine module 236, the action engine module 256, and the action engine module 271, whether a power budget is going to be exceed based on a number of cores and a next frequency level using lookup tables (e.g., the frequency-rsptime lookup table 223 and the frequency-power lookup table 224). In response to the system determining, at the action engine module 222, that the power budget is going to exceeded, the method proceeds to step 325. In response to the system determining, at the action engine module 222, that the power budget is not going to be exceeded, the method proceeds to step 330.

In embodiments, at step 325, the system performs, at one of the action engine module 222, the action engine module 236, the action engine module 256, and the action engine module 271, at least one action of reducing a frequency, reducing a number of cores, and turning off at least one core in response to a determination that the power budget is going to be exceeded. At step 330, the system performs, at one of the action engine module 222, the action engine module 236, the action engine module 256, and the action engine module 271, at least one action of increasing a frequency and increasing a number of cores in response to a determination that the power budget is not going to be exceeded (i.e., the power budget is going to be met).

Figure 10:
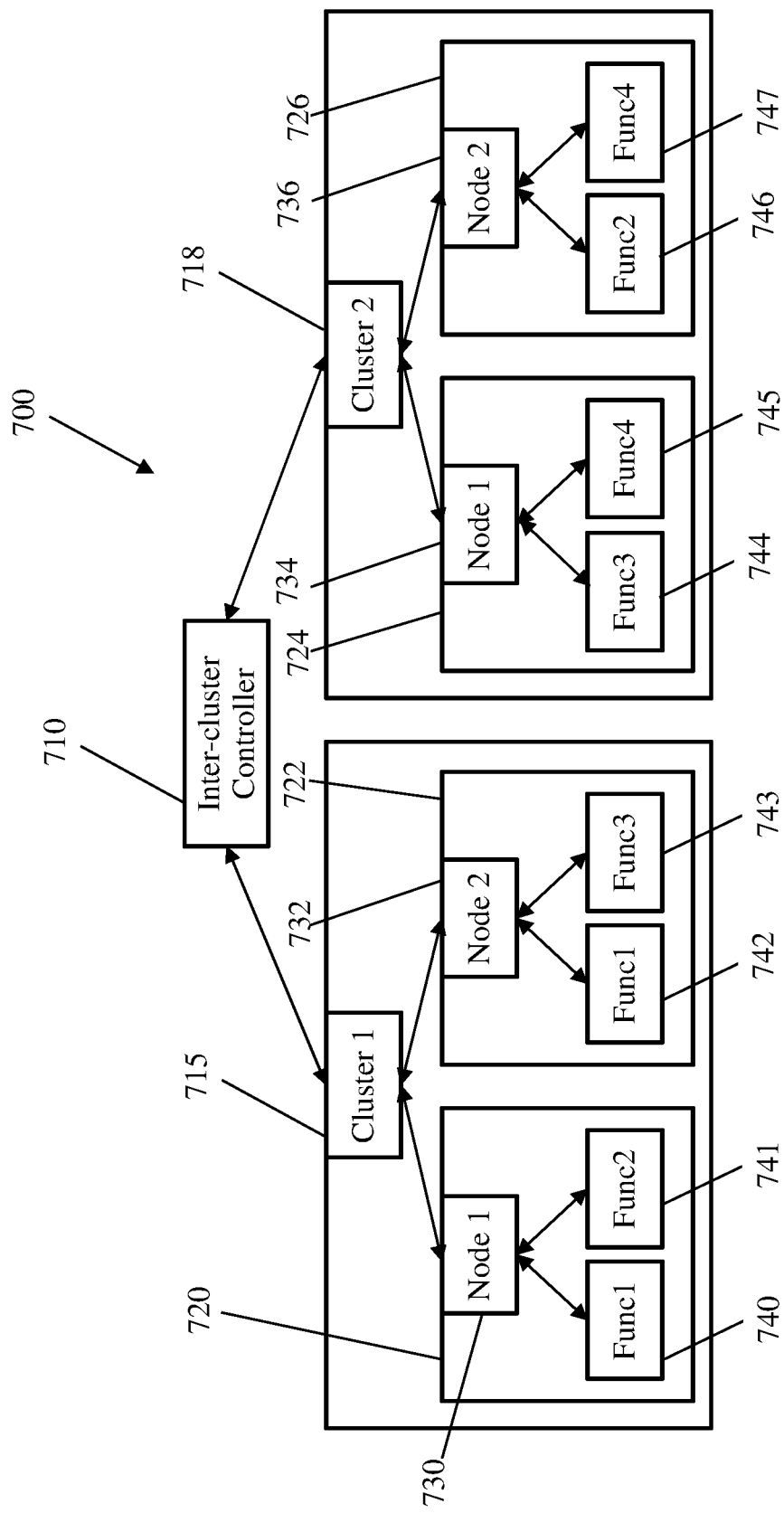
FIG. 10 shows a block diagram of an exemplary environment of a serverless computing inter-cluster controller in accordance with aspects of the present invention.

FIG. 10 shows a block diagram of another exemplary environment of the serverless computing cluster in accordance with aspects of the present invention. In FIG. 10, the block diagram of the exemplary environment of the serverless computing cluster 700 has different levels of hierarchy. In particular, the levels of hierarchy of the serverless computing cluster 700 includes a level of an inter-cluster controller 710, a level of a cluster controller (e.g., cluster 1 715 and cluster 2 718), a level of a function container (e.g., function container 1 720, function container 2 722, function container 3 724, and function container 4 726), a level of the node controller (e.g., node 1 730 of function container 1 720, node 2 732 of function container 2 722, node 1 734 of function container 3 724, and node 2 736 of function container 4 726), and a level of functions (e.g., func1 740 of function container 1 720, func2 741 of function container 1 720, func1 742 of function container 2 722, func3 743 of function container 2 722, func3 744 of function container 3 724, func4 745 of function container 3 724, func2 746 of function container 4 726, and func4 747 of function container 4 726).

Figure 11:
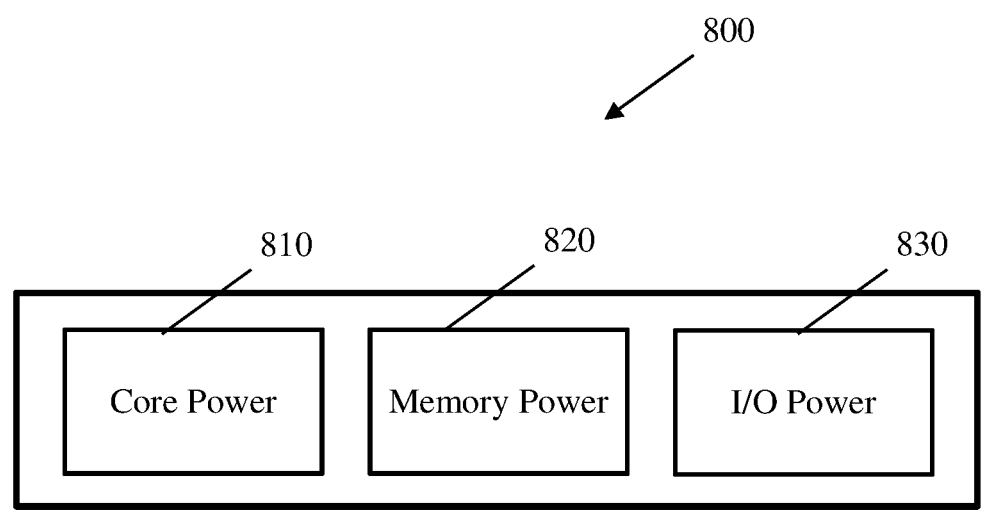
FIG. 11 shows a block diagram of an exemplary environment of a node power budget in accordance with aspects of the present invention.

FIG. 11 shows a block diagram of an exemplary environment of a node power budget in accordance with aspects of the present invention. In a node power budget 800, embodiments of the system characterize and measure memory power 820 and input/output (I/O) power 830 at a predetermined frequency level in addition to core power 810 at the predetermined frequency level described above. In particular, a node-level controller of the embodiments dynamically maintains an overall node power budget within an allocated power budget. In an example, in response to a core frequency (i.e., the core power 810) exceeding the node power budget 800, the system of the embodiments (i.e., the node-level controller) reduces at least one of the memory power 820 and the I/O power 830 in order to maintain the node power budget 800 within the allocated power budget. In an example, embodiments of the system can use a hot plug memory while putting dual in-line memory modules (DIMMs) into a standby mode in response to the core power 810 exceeding the node power budget 800.

In an example, a cloud or clustered machines are placed in a rack with a total power budget supplied by a data center of approximately 40 KWh. In embodiments, the system of the embodiments can reallocate power from one node to another node as long as the sum of all nodes within the rack has a power consumption of approximately 40 KWh. In the system of the embodiments, by reallocating power from one node to another node, there is no need to increase a frequency to all nodes to meet the SLO. In response to all of the functions being prioritized, the system of the embodiments also can allow low priority functions to miss the SLO while allowing high priority functions to meet the SLO.

Figure 12:
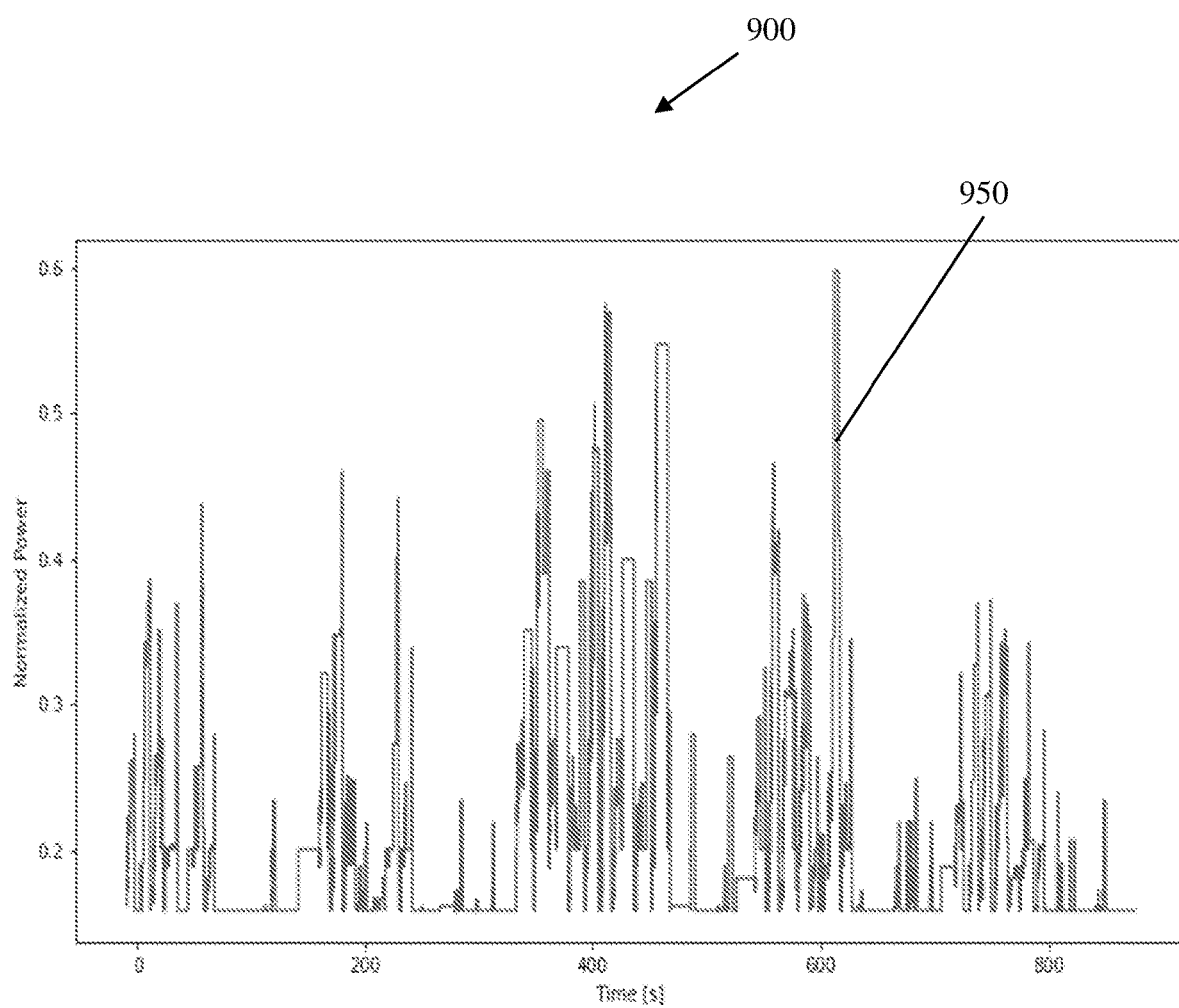
FIG. 12 shows an example of a graph of the serverless computing cluster in comparison with other systems in accordance with aspects of the present invention.

FIG. 12 shows an example of a graph of the serverless computing cluster in comparison with other systems in accordance with aspects of the present invention. The graph 900 of serverless computing cluster of embodiments includes time in seconds on the x-axis and a normalized power on the y-axis. In particular, the line 950 of the graph 900 has a three times power savings over conventional systems and five times power savings over a static maximum frequency while missing no SLO deadlines. Thus, embodiments of the serverless computing cluster reduces power consumption while still maintaining SLO deadlines.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   dynamically measuring, by a processor set, latency for a plurality of functions with a plurality of corresponding frequency levels within a serverless computing cluster;
   measuring, by the processor set, a transition latency from an idle state to an active state for the plurality of functions;
   determining, by the processor set, whether a target response time to perform a service level objective (SLO) within the serverless computing cluster is going to be missed;
   dynamically reallocating, by the processor set, at least one core and changing a frequency level across the plurality of functions by scaling down in response to a determination that the target response time to perform the SLO within the serverless computing cluster is going to be met; and
   dynamically reallocating, by the processor set, the at least one core and changing the frequency level across the plurality of functions by scaling up in response to a determination that the target response time to perform the SLO within the serverless computing cluster is going to be missed,
   wherein the dynamically reallocating the at least one core and changing the frequency level across the plurality of functions by scaling up comprises creating a new container instance for executing the plurality of functions on a different node than a node which includes the at least one core and degrading a performance of a function of the plurality of functions which has a lowest priority class of the plurality of functions, and the determining whether the target response time to perform the SLO within the serverless computing cluster is going to be missed is based on execution time, queue length, number of cores, and the SLO with minimum power.

2. The method of claim 1, wherein the target response time comprises a summation of the transition latency for the functions and the measured latency for the functions.

3. The method of claim 1, wherein the dynamically reallocating the at least one core and changing the frequency level across the plurality of functions by scaling up further comprises stealing the at least one core from a second function of a first node within the serverless computing cluster and reallocating the at least one core to a first function of the first node within the serverless computing cluster.

4. The method of claim 1, wherein the dynamically reallocating the at least one core and changing the frequency level across the plurality of functions by scaling up further comprises stealing the at least one core from a second function of a second node within the serverless computing cluster and reallocating the at least one core to a first function of a first node within the serverless computing cluster.

5. The method of claim 1, wherein the dynamically reallocating the at least one core and changing the frequency level across the plurality of functions by scaling up across the plurality of functions further comprises increasing the frequency level.

6. The method of claim 1, wherein the dynamically reallocating the at least one core and changing the frequency level across the plurality of functions by scaling down comprises lending the at least one core from a first function of a first node within the serverless computing cluster and reallocating the at least one core to a second function of the first node within the serverless computing cluster.

7. The method of claim 1, wherein the dynamically reallocating the at least one core and changing the frequency level across the plurality of functions by scaling down comprises lending the at least one core from a first function of a first node within the serverless computing cluster and reallocating the at least one core to a second function of a second node within the serverless computing cluster.

8. The method of claim 1, wherein the dynamically reallocating the at least one core and changing the frequency level across the plurality of functions by scaling down comprises decreasing the frequency level.

9. The method of claim 1, wherein the determining whether the target response time to perform the SLO within the serverless computing cluster is going to be missed is based on a following formula: Execution time*((queue length/number of cores)+1)≤SLO, with min power*number of cores.

10. A computer program product comprising one or more computer readable storage media having program instructions collectively stored on the one or more computer readable storage media, the program instructions executable to:
   measure power consumption needed to execute a function of a plurality of functions with a predetermined core frequency within a serverless computing cluster;
   store the power consumption needed to execute the function with the predetermined core frequency in at least one lookup table;

determine that a power budget of the serverless computing cluster is going to be exceeded based on a number of cores and a next frequency level using the at least one lookup table; and reduce a frequency in response to a determination that the power budget is going to be exceeded, wherein the reducing the frequency comprises creating a new container instance for executing the function on a different node than a node which includes the predetermined core and degrading a performance of the function of the plurality of functions which has a lowest priority class of the plurality of functions, and the determining whether the target response time to perform the SLO within the serverless computing cluster is going to be missed is based on execution time, queue length, number of cores, and the SLO with minimum power.

11. The computer program product of claim 10, further comprising reducing the number of cores in response to the determination that the power budget is going to be exceeded.

12. The computer program product of claim 10, further comprising turning off at least one core of the cores in response to the determination that the power budget is going to be exceeded.

13. The computer program product of claim 12, wherein the turning off at least one core comprises putting the at least one core in a deep sleep mode.

14. The computer program product of claim 10, further comprising determining whether a target response time to perform a service level objective (SLO) within the serverless computing cluster is going to be missed, the determining the target response time to perform the SLO is going to be missed is based on a tail latency for executing the function, and the tail latency represents a predetermined upper percentile of the target response time.

15. The computer program product of claim 10, wherein the next frequency level is a frequency level which ensures that the target response time to perform the SLO is going to be met, the next frequency level is different from the predetermined core frequency, and the dynamically reallocating the at least one core and changing the frequency level across the plurality of functions by scaling down comprises decreasing the frequency level to provide just enough computing power to execute the plurality of functions and still meeting the SLO.

16. A system comprising:
a processor set, one or more computer readable storage media, and program instructions collectively stored on the one or more computer readable storage media, the program instructions executable to:
dynamically measure latency for a plurality of functions with a plurality of corresponding frequency levels within a serverless computing cluster;
measure a transition latency from an idle state to an active state for the plurality of functions;
determine whether a target response time to perform a service level objective (SLO) within the serverless computing cluster is going to be missed;
dynamically reallocate at least one core and changing a frequency level across the plurality of functions by scaling down in response to a determination that the target response time to perform the SLO within the serverless computing cluster is going to be met; and
dynamically reallocate the at least one core and change the frequency level across the plurality of functions by scaling up in response to a determination that the target response time to perform the SLO within the serverless computing cluster is going to be missed,
wherein the target response time comprises a summation of the transition latency for the functions and the measured latency for the functions,
the dynamically reallocating the at least one core and changing the frequency level across the plurality of functions by scaling up comprises creating a new container instance for executing the plurality of functions on a different node than a node which includes the at least one core and degrading a performance of a function of the plurality of functions which has a lowest priority class of the plurality of functions, and
the determining whether the target response time to perform the SLO within the serverless computing cluster is going to be missed is based on execution time, queue length, number of cores, and the SLO with minimum power.

17. The system of claim 16, wherein the dynamically reallocating the at least one core and changing the frequency level across the plurality of functions by scaling up further comprises stealing the at least one core from a second function of a first node within the serverless computing cluster and reallocating the at least one core to a first function of the first node within the serverless computing cluster.

18. The system of claim 16, wherein the dynamically reallocating the at least one core and changing the frequency level across the plurality of functions by scaling down comprises lending the at least one core from a first function of a first node within the serverless computing cluster and reallocating the at least one core to a second function of the first node within the serverless computing cluster.

19. The system of claim 16, wherein the dynamically reallocating the at least one core and changing the frequency level across the plurality of functions by scaling up across the plurality of functions further comprises increasing the frequency level.

20. The system of claim 16, wherein the dynamically reallocating the at least one core and changing the frequency level across the plurality of functions by scaling down comprises decreasing the frequency level to provide just enough computing power to execute the plurality of functions and still meeting the SLO.

* * * * *